United States Patent [19]

Schoenberg

[11] 4,009,311
[45] Feb. 22, 1977

[54] STARCH-BASED ALKALINE CURING CORRUGATING ADHESIVES CONTAINING, AS CROSSLINKING AGENT, THE REACTION PRODUCT OF A KETONE, FORMALDEHYDE AND A SECONDARY AMINE

[75] Inventor: Jules E. Schoenberg, Scotch Plains, N.J.

[73] Assignee: National Starch and Chemical Corporation, Bridgewater, N.J.

[22] Filed: May 19, 1975

[21] Appl. No.: 578,671

[52] U.S. Cl. .............................. 428/182; 260/17.3; 260/64; 260/65; 428/186
[51] Int. Cl.² ...................... B32B 3/28; C08L 3/02
[58] Field of Search ................................... 260/17.3

[56] References Cited
UNITED STATES PATENTS 2,529,851  11/1950  Scrutchfield .................. 260/64

FOREIGN PATENTS OR APPLICATIONS 649,304  1/1951  United Kingdom ................ 260/64

OTHER PUBLICATIONS

A.B.I.P.C. vol. 37, No. 10 (Apr. 1967); Nakamura et al; No. 7641; "Compositions Consisting of Synthetic Resin and Starch".
A.B.I.P.C. vol. 41, No. 10 (Apr. 1971); Obetko et al; No. 9337 "Water-Proofing Adhesives for Corrugated Board."

Primary Examiner—Edward M. Woodberry
Attorney, Agent, or Firm—Edwin Szala; Ellen T. Dec

[57] ABSTRACT

Starch-based alkaline curing corrugating adhesives, containing a novel crosslinking agent comprising the reaction product of a selected ketone, formaldehyde and a secondary amine, are useful in the manufacture of corrugated paperboard. These adhesives are characterized by their economy, their superior overall stability and their excellent wet strength performance.

15 Claims, No Drawings

STARCH-BASED ALKALINE CURING CORRUGATING ADHESIVES CONTAINING, AS CROSSLINKING AGENT, THE REACTION PRODUCT OF A KETONE, FORMALDEHYDE AND A SECONDARY AMINE

BACKGROUND OF THE INVENTION

I. Field of the Invention

This invention relates to starch based alkaline curing adhesive compositions specifically intended for use in the manufacture of corrugated paperboard.

II. Brief Description of the Prior Art

In the production of corrugated board the procedure usually employed involves a continuous process utilizing a strip of paperboard corrugated by means of heated fluted rolls. An adhesive is applied to the tips of the protruding flutes on one side of the corrugated strip, a flat strip of another paperboard is then brought into contact with these tips, and, by the application of heat and pressure, a bond is formed. This procedure is then repeated on the other side of the corrugated strip so as to yield a hard sheet of paperboard comprising an inner corrugated layer contained between two flat outer layers.

The adhesive composition most widely used in the above process comprises raw, ungelatinized starch suspended in an aqueous dispersion of cooked starch. The cooked starch dispersion, being rather viscous, serves as a carrier to keep the ungelatinized starch in suspension. At the point in the corrugating process where the flutes of the corrugated paperboard are to be adhered to the flat paperboard, sufficient heat is applied to gelatinize the raw, ungelatinized starch component of the adhesive, resulting in a sudden rise in viscosity and the formation of the adhesive bond.

Since it is often desired or necessary that the corrugated adhesive yield waterproof or water resistant bonds, several procedures have been devised to produce potentially waterproof adhesive composition for use in the manufacture of corrugated paperboard. In one such procedure, amylaceous material has been combined with urea-formaldehyde resins using aluminum sulfate as a catalyst to produce waterproof or water resistant bonds. These compositions must be prepared at a pH of less than 5 in order to enable the resin to function as the waterproofing agent. This low pH, however, imparts poor flow properties to the adhesive composition, thus resulting in greatly reduced machine speeds, corrosion of the glue rolls, and prevention of the development of many desirable paste characteristics such as tackiness, viscosity, rate of setting and other properties. In another method, amylaceous material is cooked, under alkaline conditions, with urea-formaldehyde resins which set or harden at a pH of above 7. Although the bonds of corrugated board prepared from these adhesives show some improvement in water resistance, on exposure to wet weather conditions they nevertheless tend to delaminate and fail to pass U. S. Government specifications for water resistant corrugated paperboard.

Other waterproofing corrugating adhesives, such as those employing resorcinol and formaldehyde with starch, similarly suffer from serious drawbacks. The cost of these adhesives is often prohibitive because of the large amount of resorcinol that is required. In addition, these adhesives have a short pot life at the pH range most useful for maximum production speeds.

Other shortcomings of this adhesive include the slow rate of bond formation which results from its incompatibility with borax which is often added to starch-based adhesives as a tackifying agent to improve machine speeds.

Still other waterproofing corrugating adhesives employ the reaction product of acetone with formaldehyde as the waterproofing agent. A particular weakness of these adhesives is their short pot life. Thus, when acetone-formaldehyde condensates are added to conventional starch-based adhesives and the mixtures allowed to age, the wet strength of bonds obtained after 24 hours aging of the adhesive is considerably lower than after 4 hours aging. The practical consequence is that the corrugated paperboard manufacturer is frequently forced to discard adhesive that has not been used within a certain period of time.

There is thus a need in the art for a crosslinking agent for use in corrugating adhesive compositions which will exhibit wet strength performance properties superior to those found in commercially available materials, which will maintain such superior properties even after 24 hours aging, and which will be easily and economically prepared.

It is therefore an object of the present invention to provide economical corrugating adhesive compositions which possess superior wet strength performance and which remain stable for extended periods of time.

SUMMARY OF THE INVENTION

It has now been found that the use of specified concentrations of the reaction product of acetone or its dimers, formaldehyde and a secondary amine as the crosslinking agent in conventional starch-based corrugating adhesives, provides these adhesives with a combination of water resistant bonding properties, viscosity stability and pot life superior to those found in any commercially available material. In addition, these adhesives possess excellent tack, flow and machining properties, and are fully compatible with waterproofing agents of the prior art. Moreover, the water resistance of the corrugated boards prepared using these adhesives is attained within a short time after they have left the machine, thereby facilitating their further processing. In addition, the use of these adhesive compositions employing conventional corrugating equipment and processes makes possible high production speeds because of the higher alkalinity employed and the compatibility with borax.

The novel corrugating adhesives of the present invention comprise (a) from about 10 to 40%, preferably 18 to 30%, based on the total weight of the adhesive, of starch, this including the minor gelatinized portion as well as the ungelatinized portion of the starch; (b) from about 0.3 to 4% based on the total weight of the starch, of an alkali, such as sodium hydroxide; (c) a crosslinking agent in a concentration of from about 0.3 to 10%, preferably 1 to 5%, based on the total weight of the starch, comprising a reaction product of formaldehyde, a secondary amine and a ketone selected from the group consisting of acetone and its dimers, mesityl oxide and diacetone alcohol; and (d) from about 54 to 89% of water, based on the total weight of the adhesive. In order to further improve the tackifying properties of these adhesives, the practitioner may, if desired, introduce borax in a concentration of up to about 4% based on the total weight of the starch. Optionally, other ingredients such as fillers, pigments, peptizing agents for starch such as urea, stabilizing salts, etc. may be employed in the total adhesive formulation.

DETAILED DESCRIPTION OF THE PREFERRED EMBODIMENTS

The term "starch", as used herein, is meant to refer to native, raw starches as well as to modified starches such as oxidized, esterified, etherified, dextrinized and hydrolyzed starches which still retain their amylaceous characteristics. Suitable starches derived from genetically modified sources may also be used herein.

In these compositions, a major portion, preferably from about 65 to 92%, of the starch is employed in its ungelatinized, raw form, suspended in a viscous carrier which usually comprises the remaining 8 to 35% of the starch in the form of a cooked, gelatinized aqueous dispersion. Although any of the above mentioned starches may be used as the carrier portion, high amylose corn starch is a preferred starch. Upon application of heat during the corrugating process, the uncooked starch gelatinizes to produce the required viscosity increase and tack, which, in turn, makes possible the adhesive bond. The viscous carrier essentially serves to deliver the uncooked starch to the interface, where the in situ gelatinization and adhesion is to take place, and also contributes to the strength of the adhesive bond.

While the viscous carrier generally employed is an aqueous dispersion of cooked, gelatinized starch, it is to be noted that a number of water-dispersible, polyhydroxy polymeric materials including cellulose derivatives, polyvinyl alcohols and hydrolyzed polyvinly acetates may also be employed. No borax should be used in preparing adhesives which include polyvinly alcohol because of their relative incompatibility.

Although the ketone employed in the preparation of the wet strength agent may comprise either of the dimers of acetone, i.e. diacetone alcohol (4-hydroxy-4-methyl-2-pentanone) or mesityl oxide (4-methyl-3-penten-2-one), acetone is preferred due to its low cost, availability and reactivity. Thus, in the descriptions of the wet strength agents which follow, acetone will be used as representative of the useful ketones.

The secondary amines useful in the reaction products disclosed herein generally will contain from 2 to 10 carbon atoms and are of the formula: $R_1R_2NH$ wherein $R_1$ and $R_2$ are alkyl or cycloalkyl groups, or $R_1$ and $R_2$ are combined to form a heterocyclic ring containing the nitrogen atom. The $R_1$ and $R_2$ groups may also contain isolated double bonds or other functional groups which are inert and will not react with the ketone under alkaline conditions. Such inert functional groups include hydroxyl groups, ether groups or tertiary amine groups wherein the hetero-atom of the inert functional group is preferably separated from the nitrogen atom of the secondary amine by at least two carbon atoms.

Preferred secondary amines are those in which at least one of the R groups is methyl; representative amines of this class include dimethylamine and N-methyl-2-aminoethanol. Other amines useful in the present invention include diethylamine, di-n-propylamine, di-n-butylamine, piperidine, pyrrolidine, 3-methyl-pyrrolidine, oxazolidine, 2-methylimidazole, morpholine, N-methyl-2-methoxyethylamine, N,N,N'-trimethylethylenediamine, N-methylallylamine, etc. It is to be understood that while the amine is generally employed in the form of the free amine, the amine may also be used in the form of its corresponding acid salt, e.g. dimethylamine hydrochloride.

The crosslinking agents employed herein are prepared by combining 2 to 5 moles, preferably 2.5 to 4 moles, of formaldehyde and 0.25 to 1 mole, preferably 0.5 to 0.75 moles, of the secondary amine with each mole of ketone. The three components may be combined either in a Mannich-type reaction by reacting the ketone, formaldehyde and amine together in one step or by condensing the ketone and formaldehyde under alkaline conditions and subsequently adding the secondary amine thereto.

In one of the alternative method, i.e. the Mannich-type reaction, which is carried out under alkaline conditions (pH 9.5–12.0), it has been found that most of the secondary amines described herein are inherently capable of providing the system with sufficient alkalinity to effect the reaction. In a few instances, however, it may be necessary or desirable to add additional alkali in the form of an alkali metal carbonate, silicate or hydroxide in order to insure that pH conditions are maintained within the desired range.

Although moderate heat may be applied to initiate and to hasten the reaction rate, the reaction is exothermic and temperatures above 50° C. are usually unnecessary. If desired, the rate of the reaction may be decreased either by the gradual addition of one of the components, preferably the formaldehyde, or by neutralizing a portion of the amine with an acid. Similarly, the reaction rate can be increased by the addition of catalytic amounts of a strong base, for example, sodium hydroxide.

At the completion of the reaction, about 2 to 24 hours, the reaction mixture is usually neutralized using any common mineral acid such as hydrochloric or sulfuric acid. Although the actual reaction time will depend, to some extent, on the overall reaction conditions, the determination of the completion of the reaction may be based on the rate of formaldehyde consumption. On this basis, it is preferred that the reaction of the ketone, formaldehyde and amine by continued until the amount of free formaldehyde is determined to be less than 5%, based on the weight of the product.

It will be understood to those skilled in the art that the specific procedure for the preparation of the novel corrugating adhesive herein is not critical since the adhesive may be prepared in any conventional manner that will provide in the final product a uniform mixture of a dispersion of a gelatinized starch (sometimes referred to as "the carrier"), ungelatinized starch, alkali and the ketone-formaldehyde-amine reaction product. Borax, if not incompatible with the other ingredients, as well as other ingredients such as fillers, pigments, peptizing agents for starch such as urea, stabilizing salts, etc. may also be incorporated in our adhesives, if desired. It is to be noted, however, that an effective corrugating adhesive can be formulated using the crosslinking agent disclosed herein without the addition of any of these optional ingredients.

In more detail, the preparation of the novel corrugating adhesives may be described as follows:

PREPARATION OF GELATINIZED STARCH CARRIER

A slurry of the carrier portion of the starch, ordinarily about 3 to 10% of the total weight of the adhesive composition, is heated to a temperature ranging from 35 to 80° C. An aqueous solution of alkali is added thereto; alternatively, the alkali may be added in solid form as, for example, in flake or pelletized form. The alkali employed herein is preferably sodium hydroxide. Examples of other alkalies which may be employed separately or in combination with the sodium hydroxide include borax as well as alkali metal hydroxides such as potassium hydroxide, alkali metal carbonates such as sodium carbonate, and alkali metal silicates such as sodium silicate. Heating and agitation is continued for a period of time ranging from 5 to 30 minutes, after which time heating is terminated and water is added to cool and dilute the dispersion.

PREPARATION OF THE FINAL ADHESIVE

The thus prepared gelatinized starch is slowly added to a slurry comprising the remaining starch (which is ungelatinized( and water (and borax, if used), and agitation is continued until the adhesive is smooth and uniform. The preparation of the adhesive is completed by adding the desired concentration of the selected ketone-formaldehydeamine reaction product.

It can be appreciated that several variations may be readily utilized in the preparation of the corrugating adhesives as described above. Thus, it is also common in the art to incorporate the borax in the carrier dispersion, either prior to or after heating. Likewise, it is acceptable to add the crosslinking agent to the carrier or to the ungelatinized starch slurry prior to preparation of the final adhesive. The following examples with further illustrate the embodiments of our invention. All parts given are by dry weight unless otherwise noted.

EXAMPLE I

This example illustrates a typical procedure for the preparation of the reaction product of a ketone, formaldehyde and secondary amine, the crosslinking agent in the novel corrugating adhesives of the present invention.

A round bottom flask equipped with a stirrer, thermometer, pH electrode and condenser with Mallcosorb tube to provide protection from atmospheric carbon dioxide was charged with 116.2 gms. (2 moles) acetone, 162.3 gms. of a 37% solution of formalin and 189.7 gms. of paraformaldehyde containing 95% polymerized formaldehyde (total of 8 moles formaldehyde). Thereafter, 112.8 gms. (1 mole) of a 40% aqueous solution of dimethylamine was slowly added thereto while the temperature was maintained below 25° C. After addition of all the dimethylamine, the mixture was allowed to react, at a temperature between 20° and 25°, for 22 hours. The pH of the resultant mixture was adjusted to 4.0 by addition of 80.0 gms. of 12M hydrochloric acid. A sample of the resulting reaction product was found to contain about 58% of nonvolatiles and about 2.2% of free formaldehyde.

EXAMPLE II

This example illustrates the preparation of a typical corrugating adhesive of the invention.

PREPARATION OF GELATINIZED STARCH

To 149 grams of water was added 58 grams of high amylose corn starch and the mixture agitated to form a slurry. About 46 grams of a 10% aqueous sodium hydroxide solution was then added to the slurry and the mixture cooked at 60° C. for a period of 15 minutes. At the end of this period, heating was terminated and about 120 grams of water were added to cool and dilute the resultant dispersion.

PREPARATION OF THE FINAL ADHESIVE

The thus prepared gelatinized starch dispersion was thereafter added to a slurry comprising 200 grams of corn starch, 3.5 grams of borax ($Na_2B_4O_7 \cdot 10 H_2O$) and 373 grams of water. The mixture was agitated for a period of 10 minutes, after which time 6.3 grams dry weight (2.4% based on the weight of the total starch) of the acetone-formaldehyde-dimethylamine reaction product, prepared as described in Example I hereinabove, was added thereto and stirring was continued until the adhesive was uniform in texture.

Fiberboard produced using the resulting adhesive was water resistant and passed ASTM specification D1028-59.

EXAMPLE III

This example, which is divided into two parts, shows the overall superior performance of the novel adhesives of the present invention with respect to pot stability and water resistant bonding properties. In this series of tests, adhesives containing acetone-formaldehyde-secondary amine reaction products were prepared using the general procedures described in Example I and II with a variety of secondary amines in varying molar quantities. After the addition of the wet strength agent, the adhesives were stored under mild agitation at approximately 40° C. for 24 hours. Samples were drawn after 4 hours and 24 hours and were (A) subjected to rheological testing to determine the extent of thickening due to crosslinking, and (B) used to prepare paper laminates to determine the wet bond strengths.

Part A

It is well recognized that cooked starch dispersions (and particularly corn starch dispersions containing acetone formaldehyde condensates as the crosslinking agent) will tend to thicken or gel upon standing, and this phenomenon is usually observed in corrugating adhesives based on such starch dispersions. In contrast, the corrugating adhesives of this invention, by virtue of the added reaction product of a ketone-formaldehyde and secondary amine, exhibit a relatively stable viscosity over a given period of time. In order to illustrate this fact, the viscosities of the various adhesive compositions were measured after aging for 4 hours and 24 hours using a Brookfield viscometer at 20 rpm. The results of this testing are recorded in Table I. A comparison of the two viscosity measurements for each crosslinking agent clearly shows the excellent viscosity stability of the class of corrugating adhesives described herein. This stability with respect to viscosity is particularly significant to the corrugated board manufacturer since extreme variations in viscosity are not in keeping with the uniformity and control desired in the commercial manufacture of corrugated board.

Part B

As a second aspect of this example, the water resistant bonding properties of the various adhesives were also tested and recorded as part of Table I. It is to be noted that the water resistant properties of bonds formed with starch-based corrugating adhesives are largely derived from the crosslinking of the starch which takes place at the bonding interface during the in situ gelatinization. Where premature crosslinking of the starch takes place prior to actual use of the adhesive, the starch will have little or no potential remaining to crosslink at the bonding site of the paperboard laminate. As demonstrated by the relatively unchanging viscosity measurements determined in Part A. little or no crosslinking of these adhesives occurs during the 24 hour aging period. It is to be expected therefore that the adhesives of the present invention, even after aging, will be capable of forming bonds having a high degree of water resistance. Accordingly, the following procedure was used in determining and effectively demonstrating the superior water resistance bonding properties of the adhesive compositions of this invention.

Lamination were prepared utilizing the adhesive compositions described above. In this case, the laminations were performed on 50 lb. per ream wet strength paper with adhesive films of 1.5 and 3.0 mils thickness for each adhesive. The laminates were placed on a hot plate at a temperature of 177° C. applying nominal pressure (0.07 psi.) for a period of 15 seconds. The laminates were then placed in a conditioning atmosphere (22° C., 50% relative humidity) for 24 hours and thereafter, strips of these laminates were immersed in water at 22° C. for a period of 24 hours.

At the end of this period, the laminates were blotted on paper towels in order to remove the excess water, and the peel strength of each bond was determined with an Instron Tensile Tester. The peel strengths were determined with settings on the Instron Tester at 10 inches per min. cross head speed, 2 inches per min. chart speed, and 0-1 lb. chart calibration. These results are also shown in Table I.

These results show the superior water-resistant bonds which are achieved utilizing the corrugating adhesives of the present invention. Thus, the compositions containing any of a number of secondary amines produced bonds in which there was little or no decrease in water resistance even after aging of the adhesive.

and wet peel strength with aging. Moreover, the magnitude of the peel strength particularly with the preferred compositions of the invention, is consistently high. These results are in direct contrast to known acetone-formaldehyde crosslinking agents which give pronounced increases in viscosity and loss of water resistance with time due to premature crosslinking of the starch.

EXAMPLE IV

In order to show the superior properties of the corrugating adhesives of the present invention compared with conventional adhesives which use acetone-formaldehyde condensates as crosslinking agents, the following experiments were performed in which the comparative sets of adhesives were used to produce corrugated boards.

PREPARATION OF THE ADHESIVES

The procedure of Example II was repeated to produce an adhesive containing 2.0% by weight of the total starch content, of an acetone-formaldehyde-dimethylamine crosslinking agent as prepared in Example I. A similar control adhesive was prepared using 1.9% of an acetone-formaldehyde condensate as the crosslinking agent. Each of the adhesive compositions was divided into two portions; one was used immediately to make corrugated board as described hereinbelow. The other portion was held at 40° C. for 24 hours with mild agitation before being used for corrugation.

CORRUGATED PAPERBOARD MANUFACTURE

Single face, A-fluted corrugated boards were prepared using a conventional corrugator similar to those employed in the industry. The A-fluted corrugated mediums consisted of a commercially available wet

TABLE I

| Adhesives | Crosslinking Agent[1] Amine | Moles Amine | Moles HCHO | Viscosity in CPS 4 hrs. | Viscosity in CPS 24 hrs. | Peel Force (lbs./linear inch) 1.5 mil film 4 hrs. | 1.5 mil film 24 hrs. | 3.0 mil film 4 hrs. | 3.0 mil film 24 hrs. |
|---|---|---|---|---|---|---|---|---|---|
| Group I | dimethyl amine | 0.5 | 3.0 | 2700 | 4800 | .17 | .17 | .17 | .17 |
|  | dimethyl amine | 0.5 | 4.0 | 2750 | 4900 | .19 | .16 | .18 | .16 |
| Group II | N-methyl-2-aminoethanol | 0.5 | 3.0 | 2350 | 2750 | .15 | .18 | .18 | .18 |
|  | N-methyl-2-aminoethanol[2] | 0.5 | 4.0 | 2900 | 2500 | .19 | .14 | .20 | .14 |
|  | dibutylamine[2] | 0.5 | 4.0 | 2500 | 2300 | .15 | .17 | .15 | .16 |
|  | diethylamine | 0.5 | 4.0 | 2900 | 3350 | .19 | .15 | .13 | .13 |
| Group III | dimethylamine | 0.25 | 4.0 | 1050 | 1500 | .09 | .08 | .12 | .07 |
|  | dimethylamine | 0.50 | 4.0 | 1000 | 1150 | .13 | .12 | .13 | .11 |
|  | dimethylamine | 0.75 | 4.0 | 1150 | 1150 | .13 | .12 | .10 | .12 |
| Group IV | N-methyl-2-aminoethanol[2] | 0.5 | 4.0 | 1350 | 1400 | .10 | .10 | .11 | .10 |
|  | morpholine[2] | 0.5 | 4.0 | 1250 | 1300 | .11 | .10 | .10 | .09 |
| Group V | diethanolamine[3] | 0.75 | 4.0 | 750 | 860 | .14 | .09 | .10 | .10 |
| Group VI | piperidine[2] | 0.5 | 4.0 | 1650 | 2500 | .12 | .12 | .10 | .10 |
|  | 2-methylimidazole[2] | 0.5 | 4.0 | 1600 | 1400 | .13 | .10 | .10 | .10 |

[1]All crosslinking agents were prepared using 1 mole of acetone.
[2]Catalytic amount of NaOH added.
[3]Prepared by first condensing the acetone and formaldehyde and subsequently adding amine.

It is to be noted that the adhesives in Table I are divided into six separate groups. Each group represents adhesives prepared at the same time using the same batches of high amylose starch. Since there are biological variations between different batches of starch, the results obtained with the different adhesive compositions within each group may be compared only with those results obtained for other members of the same group.

In summarizing the results shown in Table I, it is apparent that the adhesive compositions of the present invention exhibit relatively small changes in viscosities strength fiberboard which had a basis weight of 30 pounds per 1000 sq. ft., and the liner boards consisted of a commercially available wet strength fiberboard having a basis weight of 62 pounds per 1000 sq. ft. Both the mediums and the liner boards were preheated by a series of rolls over which they were passed prior to the application of the adhesive at the lower corrugator roll. The average temperature of all the rolls was about 177° C. In addition to being heated by the rolls, the medium was impinged with steam to facilitate fluting. The metering gap on the glue roll, through which the adhesive was dispensed, was set at 0.012 inches. This setting allowed for a coating weight on the 7 inch wide board samples equivalent to about 1.5 pounds per 1000 sq. ft. Several samples of corrugated boards were made from each portion of adhesive at one of five varied machine speeds ranging from 50 to 420 feet per minute (fpm.).

Upon completion of the corrugating operations, samples were cut from each of the boards. Some samples were aged under simulated environmental conditions as will be described below, and all were immersed in water (22° C) for one hour and tested using the TAPPI Standard UM 802 (formerly R 337) Pin Adhesion Test. The test results were recorded in terms of pounds per specimen area required to completely separate the fluted medium from the liner. The results are recorded in Table II. The testing and terms referred to in Table II are described as follows:

1. Fresh Wet Pin Test

The adhesive was prepared and immediately used to make corrugated board. Samples of the board were immersed in water for 1 hour and then subjected to the aforementioned Pin Adhesion test.

2. Aged Wet Pin Test

The adhesive was held at 40° C. with mild agitation fro 24 hours prior to corrugation. The corrugated board was then immersed in water for 1 hour and then subjected to the Adhesion test.

3. Over Cured Wet Pin Test (fresh)

The adhesive was prepared and immediately used to make corrugated board. Samples of the board were then placed in an environmental chamber at 57° C. and approximately 90% relative humidity for 24 hours in order to simulate the storage of stacked boards in the manufacturing operation. The "oven cured" samples were immersed in water for 1 hour and tested.

4. Oven Cured Wet Pin Test (aged)

The adhesive was held at 40° C. with mild agitation for 24 hours prior to corrugation. The corrugated board was then subjected to the testing conditions described in Part 3.

In the following table, S is used to represent the results obtained with the sample adhesive containing the novel crosslinking agent of the present invention while C represents the results obtained with the control adhesive employing the acetone-formaldehyde condensate of the prior art.

TABLE II

| Machine Speed | Fresh Wet Pin | | Aged Wet Pin | | Oven Cured Wet Pin | | | |
| | | | | | Fresh | | Aged | |
| | S | C | S | C | S | C | S | C |
| --- | --- | --- | --- | --- | --- | --- | --- | --- |
| 50 | 6.0 | 4.0 | 3.0 | 2.0 | 23.0 | 18.0 | 19.0 | 15.0 |
| 150 | 9.0 | 7.0 | 6.0 | 2.0 | 30.0 | 19.0 | 29.0 | 19.0 |
| 250 | 8.0 | 10.0 | 7.0 | 1.0 | 31.0 | 22.0 | 34.0 | 16.0 |
| 350 | 4.0 | 3.0 | 1.0 | 0.0 | 16.0 | 17.0 | 20.0 | 8.0 |
| 420 | 0.0 | 1.0 | 0.0 | 0.0 | 11.0 | 3.0 | 17.0 | 1.0 |

The results shown in Table II clearly demonstrate the ability of the corrugating adhesives of the present invention to yield superior water-resistant bonds when compared with the bonds formed using an adhesive of the prior art. The results also show the improved stability of the present adhesives, i.e. their ability to remain free of premature crosslinking of the starch and thereby their ability to rapidly and efficiently bond paperboard when used in a commercial operation.

It is to be noted that the poor results obtained for both the test samples and the control adhesives produced at 420 fpm in the Fresh and Aged Wet Pin Tests reflects the inadequate gelatinizing and crosslinking of the starches resulting from their extremely brief exposure to the heated rolls of the corrugator. It is also to be noted however, that when these same adhesives were subjected to the oven curing operation which simulates the commercial environment, the wet strength properties of the bonds produced using the adhesives of the present invention increased dramatically while the bond strength of the control samples remained poor.

EXAMPLE V

This example illustrates the use of the dimers of acetone in the production of the corrugating adhesives of the present invention.

The procedure of Example I was repeated to prepare two reaction products. The first product comprised 1 mole of mesityl oxide with 4 moles of formaldehyde and 0.75 moles of dimethylamine. The second product comprised 1 mole of diacetone alcohol with 2.5 moles of formaldehyde and 0.75 moles of dimethylamine. The products thus produced were then formulated into adhesives using the procedure of Example II and tested for stability and water resistance as described in Example III. The results are shown in Table III below.

TABLE III

| Ketone | Viscosity in CPS | | Peel Force (lbs./linear inch) | | | |
| | | | 1.5 mil film | | 3.0 mil film | |
| | 4 hrs. | 24 hrs. | 4 hrs. | 24 hrs. | 4 hrs. | 24 hrs. |
| --- | --- | --- | --- | --- | --- | --- |
| mesityl oxide | 1800 | 1800 | .11 | .14 | .14 | .13 |
| diacetone alcohol | 1400 | 1900 | .08 | .12 | .09 | .10 |

It is apparent from the results of this example that satisfactory corrugating adhesives may be prepared using either of the dimers of acetone as the ketone component.

In summary, the novel corrugating adhesives provided by the present invention are characterized by their stable viscosity, prolonged pot life and particularly by their ability to form stable, water resistant bonds even after the adhesives have been aged for up to 24 hours. Moreover, these corrugating adhesives provide these superior overall performance properties while being prepared from economical, readily available materials.

Variations may be made in materials, proportions and procedures without departing from the scope of this invention as defined by the following claims.

I claim:

1. A corrugating adhesive comprising (a) starch in a concentration of from about 10 to 40%, based on the total weight of the adhesive, wherein a minor portion of the starch is gelatinized and the remainder is ungelatinized; (b) an alkali in a concentration of from about 0.3 to 4%, based on the total weight of the starch; (c) a crosslinking agent in a concentration of from 0.3 to 10%, based on the total weight of the starch, comprising the reaction product of (i) a ketone selected from the group consisting of acetone, mesityl oxide and diacetone alcohol, (ii) formaldehyde and (iii) a secondary amine, wherein the reaction product comprises 2 to 5 moles formaldehyde and 0.25 to 1 mole secondary amine per mole ketone; and (d) from about 54 to 89% water, based on the total weight of the adhesive.

2. The corrugating adhesive of claim 1 wherein the secondary amine contains from 2 to 10 carbon atoms and is characterized by the formula:

wherein $R_1$ and $R_2$ are alkyl or cycloalkyl groups or $R_1$ and $R_2$ are combined to form a hetercyclic ring containing the nitrogen atom.

3. The corrugating adhesive of claim 2 wherein the $R_1$ or $R_2$ group additionally contains at least one isolated double bond or inert functional group.

4. The corrugating adhesive of claim 2 wherein at least one of $R_1$ and $R_2$ is methyl.

5. The corrugating adhesive of claim 1 wherein the secondary amine is dimethylamine.

6. The corrugating adhesive of claim 1 wherein the secondary amine is N-methyl-2-aminoethanol.

7. The corrugating adhesive of claim 1 wherein the ketone is acetone.

8. The corrugating adhesive of claim 1 wherein the reaction product of the ketone, formaldehyde and secondary amine comprises 2.5 to 4 moles formaldehyde and 0.5 to 0.75 mole secondary amine per mole ketone.

9. The corrugating adhesive of claim 1 wherein the alkali is sodium hydroxide.

10. The corrugating adhesive of claim 1 wherein there is also present borax.

11. The corrugating adhesive of claim 1 wherein the gelatinized starch is at least partially replaced with a water dispersible, polyhydroxy polymeric material selected from the group consisting of polyvinyl alcohol and hydrolyzed polyvinyl acetate.

12. The corrugating adhesive of claim 1 wherein the gelatinized starch is high amylose corn starch.

13. A corrugating adhesive comprising (a) corn starch in a concentration of from about 18 to 30% based on the total weight of the adhesive, wherein a minor portion of the starch is gelatinized and the remainder is ungelatinized; (b) an alkali in a concentration of about 3% based on the total weight of the starch; (c) a crosslinking agent in a concentration of from 1 to 5%, based on the total weight of the starch, comprising the reaction product of (i) a ketone selected from the group consisting of acetone, mesityl oxide and diacetone alcohol, (ii) formaldehyde and (iii) a secondary amine; and (d) from about 64 to 76% water, based on the total weight of the adhesive.

14. A corrugated paperboard product comprising an inner corrugated layer contained between two flat outer layers prepared employing the corrugating adhesive of claim 1.

15. A corrugated paperboard product comprising an inner corrugated layer contained between two flat outer layers prepared employing the corrugating adhesive of claim 13.

* * * * *